United States Patent [19]
Rice

[11] 3,755,253
[45] Aug. 28, 1973

[54] CATALIZATION OF DIAMINODIPHENYLSULFONE CURE OF POLYEPOXIDES WITH AN IMIDAZOLE COMPOUND OR A SALT THEREOF

[75] Inventor: Kenneth K. Rice, Walnut Creek, Calif.

[73] Assignee: Shell Oil Company, Houston, Tex.

[22] Filed: Sept. 24, 1971

[21] Appl. No.: 183,654

Related U.S. Application Data

[63] Continuation-in-part of Ser. No. 14,658, Feb. 26, 1970, abandoned.

[52] U.S. Cl......... 260/47 EN, 117/124 E, 117/154, 161/184, 161/185, 260/2 N, 260/18 PF, 260/33.2 EP, 260/37 EP, 260/59, 260/75 EP, 260/78.4 EP, 260/88.7 B, 260/93.5 A, 260/94.7 N, 260/130 TW
[51] Int. Cl............................................. C08g 30/14

[58] Field of Search .......... 260/47 EN, 2 N, 18 EP, 260/78.4 EP, 830.1 W, 75 EP, 59

[56] References Cited
UNITED STATES PATENTS

| | | | |
|---|---|---|---|
| 3,356,645 | 12/1967 | Warren................................. | 260/47 |
| 2,915,490 | 12/1959 | Hopper et al........................ | 260/47 |
| 3,438,937 | 4/1969 | Christie................................. | 260/47 |
| 2,981,711 | 4/1961 | Meyer et al.......................... | 260/47 |

*Primary Examiner*—William H. Short
*Assistant Examiner*—T. Pertilla
*Attorney*—Norris E. Faringer and Martin S. Baer

[57] ABSTRACT

New adhesive compositions having substantially shortened cure cycles comprise the reaction product of (1) a polyepoxide (2) an aromatic amine such as diaminodiphenylsulfone, and (3) a catalytic amount of an imidazole compound or a salt thereof.

7 Claims, No Drawings

CATALIZATION OF DIAMINODIPHENYLSULFONE CURE OF POLYEPOXIDES WITH AN IMIDAZOLE COMPOUND OR A SALT THEREOF

BACKGROUND OF THE INVENTION

This application is a continuation-in-part of Ser. No. 14,658, filed Feb. 26, 1970 now abandoned.

It is known to cure polyepoxides with salts of an imidazole compound. See, for example, Warren – U.S. Pat. No. 3,356,645. It is also known that polepoxides can be cured with amines. However, condensates prepared from polyepoxides cured with imidazole salts exhibit long cure cycles which restrict their uses particularly for use in fast-curing laminates and adhesives.

Good adhesive and laminate properties can be obtained from glass cloth impregnated with a resin system comprising a polyepoxide cured with an aromatic amine such as diaminodiphenylsulfone. Usually, cures are effected by gelling the system for 30 to 60 minutes at 100° to 170°C, followed by post-curing for 16 to 20 hours at 175° to 200°C for maximum properties. While the properties of these laminates are satisfactory, the cure schedules are too long for many applications and make them unsuitable for many adhesive applications. It has now been unexpectedly discovered that new adhesive compositions exhibiting significantly shortened cure cycles are prepared by reacting (1) a polyepoxide with (2) a special aromatic amine, i.e., diaminodiphenylsulfone, in the presence of (3) a catalytic amount of an imidazole compound or a salt thereof.

SUMMARY OF THE INVENTION

This invention relates to novel polyepoxide compositions which exhibit substantially shortened cure cycles and therefore are especially useful as adhesives and laminating materials.

More particularly, it has now been discovered that substantially shortened cure cycles are obtained in the curing of polyepoxides with diaminodiphenylsulfone through the use of a catalyst which comprises a compound, of a salt thereof, of a heterocyclic nitrogen compound possessing in the ring (1) a substituted C—N=C group and (2) an —NH— group, and preferably an imidazole compound, or a salt thereof, having the structural formula

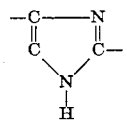

Suitable such catalysts, include, among others, imidazole, 2-ethyl-4-methylimidazole, 2-methylimidazole, benzimidazole, imidazole lactate, imidazole acetate, 2-ethyl-4-imidazole lactate, benzimidazole lactate, benzimidazole acetate, etc.

As noted hereinbefore, when diaminodiphenylsulfone is used to cure polyepoxides, effective cures require gelling the system for 30 to 60 minutes at 100° to 170°C, followed by post cures of 16 to 20 hours at 175° to 200°C. It is therefore quite surprising that with the use of the instant imidazole catalysts, this curing system may be cured at very short periods, i.e., of from 1 to 2 hours at low temperatures, i.e., of about 120°–140°C. It is equally surprising that the use of other aromatic amines, such as methylene-dianiline, do not provide good hot strength or extended shelf life at accelerated cure cycles.

DESCRIPTION OF THE PREFERRED EMBODIMENT

The present invention provides for polyepoxide compositions having significantly shortened cure cycles suitable for use as adhesives comprising the catalyzed reaction product of (1) a polyepoxide and (2) an aromatic compound having the formula

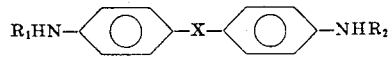

wherein $R_1$ and $R_2$ are each selected from the group consisting of hydrogen and hydrocarbon radicals and X is selected from the group consisting of hydrocarbon radicals and $SO_2$, said reaction product being catalyzed by a heterocyclic nitrogen compound, or salt thereof, which possess in the ring (1) a substituted C=N—C group and (2) a =N—H— group, and preferably an imidazole compound, or a salt thereof, having the structural formula

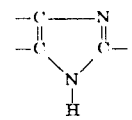

The catalysts useful in this invention comprise the heterocyclic compounds and their salts, possessing in the heterocyclic ring (1) a substituted C=N—C group and (2) a secondary amino group, i.e., an =N—H— group. Preferred examples of these heterocyclic compounds include, among others, the imidazoles, such as substituted imidazoles and benzimidazoles having the structural formulae:

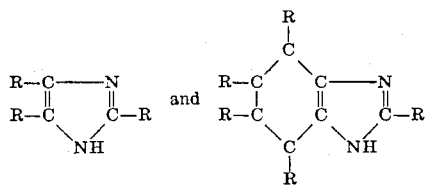

respectively, wherein R is selected from the group consisting of hydrogen atoms, halogen atoms, and an organic radical, preferably a hydrocarbon radical or a substituted hydrocarbon radical, as for example, the ester, ether, amide, imide, amino, halogen, or mercapto-substituted hydrocarbon radicals. The acid portion of the salt is selected from an acid, such as phosphoric, acetic lactic, formic, and the like. Preferred imidazoles are those wherein the substituent is hydrogen of a hydrocarbon radical, and preferably an alkyl, alkenyl, cycloalkyl, cycloalkenyl, aryl, alkaryl or arylalkyl radicals, and particularly those containing no more than 15 carbon atoms and wherein the acid is selected from monocarboxylic acids having from one to 8 carbon atoms, lactic and phosphoric acids.

A more detailed description of the chemistry of the imidazoles and benzimidazoles including their properties and structural formulas is found in the book by Klaus Hofman entitled "Imidazole and Its Derivatives," published by Interscience Publishers, Inc., New York (1953). Examples of suitable imidazole compounds and their salts include, among others, imidazole, benzimidazole and substituted imidazoles as well as the acetate, formate, lactate, and phosphate salts of imidazole, benzimidazole, and substituted imidazoles. Examples of suitable substituted imidazoles include: 2-methylimidazole; 2-ethyl-4-methylimidazole; 2-cyclohexyl-4-methylimidazole; 4-butyl-5-ethyl-imidazole; 2-butoxy-4-allylimidazole; 2-carboethoxybutyl-4-methylimidazole; 2-octyl-4-hexylimidazole; 2-methyl-5-ethylimidazole; 2-ethyl-4-phenylimidazole; 2-amide-5-ethylimidazole; 2-ethyl-4-(2-ethylamino)-imidazole; 2-methyl-4-mercaptoethylimidazole; 2-butylacetate-5-methylimidazole;2,5-chloro-4-ethyl-imidazole; and mixtures thereof. Especially preferred are the alkyl-substituted imidazoles and their acetates and lactates wherein the alkyl groups contain not more than 8 carbon atoms each, or mixtures thereof, and parti-cularly preferred are 2-ethyl-4-methylimidazole acetate, 2-ethyl-4-methyl-imidazole lactate, 2-methylimidazole acetate, 2-methylimidazole lactate, imidazole acetate, imidazole lactate, and mixutres thereof.

The imidazoles are prepared by conventional techniques of reacting a dialdehyde with ammonia and formaldehyde.

The above-described imidazole salts can be prepared by reacting the imidazole with the acid to form the corresponding amine salt. The salts are preferably prepared by mixing the desired acid with the imidazole and maintaining the temperature between 23° and 100°C. Solvents are not necessary but may be employed if desired. One should use at least one gram molecular weight of acid to each gram molecular weight of the imidazole. If greater stability is desired, one should use a larger ratio, i.e., up to a 2:1 ratio of acid to imidazole. The higher the acid level, the more stable the resin-catalyst mixture. The reaction is preferably accomplished at temperatures between 23°C and 150°C. As heat is evolved in the reaction, cooling means may be needed to keep the temperature in the desired range.

The polyepoxides to be used in preparing the compositions of the present invention comprise those materials possessing more than one vicinal epoxy group, i.e., more than one

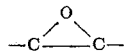

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are those having an epoxy equivalency greater than 1.0.

Various examples of polyepoxides that may be used in the process of the invention are given in U.S. Pat. No. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as expoxidized linseed, soybean, perilla, oiticia, tung, walnut and dehydrated castor oil, methyl linoleate, butyl linoleate, ethyl 1,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl)oxalate, di(2,3-epoxy-hexyl)succinate, di(3,4-epoxybutyl)maleate, di(2,3-epoxyoctyl)pimelate, di(2,3-epoxybutyl)phthalate, di(2,3-epoxyoctyl)tetrahydrophthalate, di(4,5-epoxydodecyl)maleate, di(2,3-epoxybutyl)terephthalate, di(2,3-epoxypentyl)thiodipropionate, di(5,6-epoxytetradecyl)diphenyldicarboxylate, di(3,4-epoxyheptyl)sulfonyldibutyrate, tri(2,3-epoxybutyl)1,2,4-butanetricarboxylate, di(5,6-epoxypentadecyl)tartarate, di(4,5-epoxytetradecyl)maleate, di(2,3-epoxybutyl)azelate, di(3,4-epoxybutyl) citrate, di(5,6-epoxyoctyl)cyclohexane-1,2-dicarboxylate, di(4,5-epoxy-octadecyl)malonate.

Another group of the epoxy-containing materials includes those epoxidized esters of unsaturated alcohols and unsaturated carboxylic acids, such as 2,3-epoxybutyl-3,4-epoxypentanoate, 3,4-epoxyhexyl, 3,4-epoxycyclohexanoate, 3,4-epoxycyclohexyl-4,5-epoxyoctanoate, 2,3-epoxycyclohexylmethyl epoxycyclohexane carboxylate.

Still another group of the epoxy-containing materials includes epoxidized derivatives of polyethylenically unsaturated polycarboxylic acids, such as, for example, dimethyl 8,9,12,13-diepoxyeicosanedioate, dibutyl 7,8-,11,12-diepoxyoctadecanedioate, dioctyl 10,11-diethyl-8,9,12,13-diepoxyeiconsanedioate, dihexyl 6,7-,10,11-diepoxyhexadecanedioate, didecyl 9-epoxyethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polydydric alcohol an/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among other, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. Pat. No. 2,633,458 are good examples of polyepoxides of this type. Other examples include the polyglycidyl ether of 1,1,2,2-tetrakis(4-hydroxyphenyl)ethane (epoxy value of 0.45 eq/100g and melting point 85°C), polyglycidyl ether of 1,1,5,5-tetrakis(hydroxyphenyl) pentane (epoxy value of 0.514 eq/100g) and the like and mixtures thereof. Other examples include the glycidated novolacs as obtained by reacting epichlorohydrin with novolac resins obtained by condensation of aldehyde with polyhydric phenols.

The aromatic amines which may be used in the present invention comprise compounds having the formula

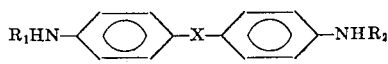

wherein $R_1$ and $R_2$ are selected from the group consisting of H and hydrocarbon radicals an X is selected from the group consisting of hydrocarbon radicals and $SO_2$. Preferred hydrocarbon radicals have from one to 8 carbon atoms, such as, for example, methyl, ethyl, propyl, etc. A preferred aromatic amine is diaminodiphenylsulfone. The quantities in which the polyepoxides and the aromatic amine curing agents are combined will vary over a wide range to obtain the best cure. The aromatic amine curing agent is preferably employed in amounts varying from about 10 to 40 phr and preferably 20 to 30 phr. The imidazole compound or imidazole salt catalyst may be used in amounts varying from about 1 to 3 phr and preferably from 1.5 to 2 phr.

The curing of the polepoxides may be accomplished by mixing the polyepoxides with the aromatic amine and imidazole compound or imidazole salt catalyst and heating the resulting composition at moderate temperatures, i.e., 90°–160°C for 1 to 3 hours. Additional materials, e.g., pigments, stabilizers, plasticizers and diluents may be added.

The compositions of this invention are also useful for preparing laminates. In preparing the laminate, the sheets of fibrous material are first treated with the mixture of polyepoxide and curing agent. This is conveniently accomplished by spreading the paste or solution containing the above-noted mixture onto the sheets or glass cloth, paper textiles, etc. The sheets are then superimposed and the assembly cured under heat and pressure. The assembly is preferably cured in a heated press under a pressure of about 25 to 500 or more pounds per square inch and temperatures of about 150°C. The resulting laminate is extremely strong and resistant against heat and the action of organic and corrosive solvents.

The fibrous material used in the preparation of the laminates may be of any suitable materials, such as glass cloth and matting, paper, asbestos paper, mica flakes, cotton bats, duck muslin, canvas, synthetic fibers such as nylons, dacron, and the like. It is usually preferred to utilize woven glass cloth that has been given prior treatment with well known finishing or sizing agents, therefore, such as chrome methacrylate or vinyl trichlorosilane.

The compositions of this invention are further useful in filament windings and in casting applications, such as encapsulation and/or embedment of electrical devices and preparation of cast foams containing microballoons.

To illustrate the manner in which the invention may be carried out, the following examples are given. It is understood, however, that the examples are for purposes of illustration and the invention is not to be regarded as limited to any of the specific materials or conditions therein.

The term "phr" as used herein, means "parts per 100 parts by weight of the polyepoxide." The term "Pbw" means "parts by weight."

EXAMPLE I

Four compositions were prepared as follows:

| | 1 | 2 | 3 | 4 |
|---|---|---|---|---|
| DEN 438[1] | 51.75 Pbw | 51.75 Pbw | 53.0 Pbw | 53.0 Pbw |
| PKDA 8500[2] | 9.0 | 9.0 | | |
| EPON Resin 826[3] | 20.0 | 20.0 | | |
| EPON Resin 828[4] | | | 17.0 | 17.0 |
| EPON Resin 1001[5] | 6.0 | 6.0 | | |
| EPON Resin 1004[6] | | | 15.0 | 15.0 |
| DER 542[7] | 7.5 | 7.5 | 7.5 | 7.5 |
| Antimony Oxide | 0.75 | 0.75 | 0.75 | 0.75 |
| GANTREZ M-094[8] | 5.0 | 5.0 | 6.0 | 6.0 |
| CAB-O-SIL M-5[9] | | | | 2.0 |
| Diaminodiphenylsulfone | 17.5 | 17.5 | 17.0 | 17.0 |
| Lactic acid salt of imidazole | 1.5 | | | |
| 2-ethyl-4-methyl imidazole | | 1.0 | 1.0 | 1.0 |

1) DEN 438: Polyglycidyl ether of phenol-formaldehyde novolac [polyphenol-formaldehyde poly(2,3-epoxypropyl)ether] epoxy eq/100g of 0.56.
2) PKDA 8500: Phenoxy Copolymer of Bisphenol A and Epichlorohydrin, MW about 25,000, Secondary Hydroxyl:6% by wt.
3) EPON Resin 826: Glycidyl ether of 2,2-bis(4-hydroxypheyl) propane having an epoxy eq/100g of 0.54.
4) EPON Resin 828: Glycidyl ether of 2,2-bis(4-hdroxyphenyl) propane having an epoxy eq/100g of 0.54.
5) EPON Resin 1001: Glycidyl ether of 2,2-bis(4-hydroxyphenyl) propane having an epoxy eq/100g of 0.23.
6) EPON Resin 1004: Glycidyl ether of 2,2-bis(4-hydroxyphenyl) propane having an epoxy eq/100g of 0.11.
7) DER 542: Diglycidyl ether of tetrabromobisphenol A (2,2-bis[4-(2,3-epoxypropoxy)-3,5-dibromophenyl)-epoxy eq/100g of 0.28.
8 GANTREZ M-094: Polyvinylmethylether.
9) CAB-O-SIL: Fumed colloidal silica.

The resins were combined by stirring in an open vessel at 120°–130°C. The diaminodiphenylsulfone was added and heated until dissolved. The temperature of the mixture was then reduced to 70°–80°C and the catalyst added. The mixture was then impregnated into Style 181–150 glass cloth sized with chrome methacrylate by pressing between hot steel rollers set to approximately 70°C. The pre-impregnated cloth was then cooled and stored at 0°F prior to preparing the test specimens.

The following test specimens were prepared by bringing together 12 plies of the pre-impregnated cloth oriented in a parallel direction of warp and curing in a steam press for 1.5 hours at 250°F under 30 psi. Approximately shaped specimens were machined from the resulting laminate. Tests were conducted according to Federal Test Standard 406 and the results are tabulated in Table I.

TABLE I

|  | 1 | 2 | 3 | 4 |
|---|---|---|---|---|
| resin content, % | 36.6 | 35.0 | 37.0 | 37.6 |
| density, g/cc | 1.73 | 1.73 | 1.74 | 1.73 |
| compressive strength, psi | $3.99 \times 10^4$ | $4.25 \times 10^4$ | $4.23 \times 10^4$ | $4.12 \times 10^4$ |
| compressive modulus, psi | $2.63 \times 10^6$ | $2.85 \times 10^6$ | $3.01 \times 10^6$ | $2.96 \times 10^6$ |
| flexural strength, psi | $7.04 \times 10^4$ | $6.49 \times 10^4$ | $5.76 \times 10^4$ | $5.24 \times 10^4$ |
| flexural modulus, psi | $2.88 \times 10^6$ | $2.91 \times 10^6$ | $2.99 \times 10^6$ | $2.73 \times 10^6$ |
| tensile strength, psi | $4.81 \times 10^4$ | $4.49 \times 10^4$ | $3.68 \times 10^4$ | $3.10 \times 10^4$ |
| tensile modulus, psi | $2.95 \times 10^6$ | $3.03 \times 10^6$ | $3.10 \times 10^6$ | $2.82 \times 10^6$ |
| interlaminar shear, psi | 2075 | 2220 | 2085 | 2265 |

Three test specimens of each of the compositions of Example I were prepared by applying 3 plies of the pre-impregnated cloth, oriented parallel to the warp direction, to each side of a heat resistant phenolic honeycomb core 0.27 in. thick having a 3/16 in. cell size with 4.0 mil non-perforated walls thereby forming a sandwich structure. The sandwich structures were cured in an autoclave for 1.5 hours at 250°F under 30 psi and one 3-ply skin subsequently peeled away as described by U.S. Military Specification MIL-A-25463. Table II tabulates the results of that test.

TABLE II

|  | 1 | 2 | 3 | 4 |
|---|---|---|---|---|
| Sandwich, Peel/77°F (Top Skin), in.lb/in. (ave) | 8.2 | 5.5 | 6.1 | 8.3 |
| Sanwich Peel/77°F (Bottom Skin), in.lb/in. (ave) | 14.3 | 6.4 | 11.0 | 13.3 |

Five test specimens of each of the compositions of Example I were prepared by applying one ply of the pre-impregnated cloth to 2024-T3 clad aluminum, a 0.5 in. overlap prepared in accordance with Federal Specification MMM-A-132 and cured in a circulating oven for 1.5 hours at 250°F under 20 psi. Table III tabulates the results of that test.

TABLE III

|  | 1 | 2 | 3 | 4 |
|---|---|---|---|---|
| Tensile Shear/77°F, psi (ave) | 2815 | 2190 | 2275 | 2295 |
| Tensile Shear/250°F, psi (ave) | 2395 | 1940 | 2050 | 2210 |

EXAMPLE II

This example illustrates that the use of the diaminodiphenylsulfone (DDS)/imidazole lactate system is superior to the use of DDS or imidazole lactate alone to cure polyepoxides.

Two compositions were prepared as follows (components are utilized on a parts by weight basis):

| Components | 1 | 2 |
|---|---|---|
| DEN 438[1] | 51.75 | 51.75 |
| PKDA 8500[2] | 9.0 | 9.0 |
| EPON Resin 826[3] | 20.0 | 20.0 |
| EPON Resin 1001[4] | 6.0 | 6.0 |
| DER 542[5] | 7.5 | 7.5 |
| Antimony Oxide | 0.75 | 0.75 |
| GANTREZ M-094[6] | 5.0 | 5.0 |
| Diaminodiphenylsulfone | 17.5 | 17.5 |
| Lactic Acid Salt of Imidazole | 1.5 |  |
| 2-ethyl-4-methylimidazole |  | 1.0 |

1) DEN 438: Polyglycidyl ether of phenol formaldehyde novolac [polyphenol-formaldehyde poly(2,3-epoxypropyl)ether] epoxy eq/100g of 0.56.
2) PKDA 8500: Phenoxy Copolymer of Bishphenol A and Epichlorohydrin, MW about 25,000, Secondary Hydroxyl: 6% by wt.
3) EPON Resin 826: Glycidyl ether of 2,2-bis(4-hydroxyphenyl) propane having an epoxy eq/100g of 0.54.
4) EPON Resin 1001: Glycidyl ether of 2,2-bis(4-hydroxyphenyl) propane having an epoxy eq/100g of 0.23.
5) DER 542: Diglycidyl ether of tetrabromobisphenol A (2,2-bis[4-(2,3-epoxypropoxy)-3,5-dibromophenyl]propane)-epoxy eq/100g of 0.28.
6) M-094: Polyvinylmethylether.

The resins were combined by stirring in an open vessel at 120°–130°C. The diaminodiphenylsulfone was added and heated until dissolved. The temperature of the mixture was then reduced to 70°–80°C and the catalyst added. The mixture was then impregnated into Style 181–150 glass cloth sized with chrome methacrylate by pressing between hot steel rollers set to approximately 70°C. The pre-impregnated cloth was then cooled and stored at 0°F prior to preparing the test specimens.

Three test specimens of each composition were prepared by applying one ply of the pre-impregnated cloth to 2024-T3 clad aluminum, a 0.5 inch overlap prepared in accordance with Federal Specification MMM-A-132 and cured in a circulating oven for 1.5 hours at 250°F under 20 psi. The comparative data are tabulated in Table IV.

The 250°F shear tests clearly show the curability of the imidazole salt catalyzed diaminodiphenylsulfone (DDS) system as low as 200°F, whereas there is only weak cure at 300°F when the catalysts are not employed. Also, it is clear that when using the instant catalysts alone in low concentrations, incomplete cure results. These comparative data illustrate the superiority of the DDS-imidazole lactate combination over use of DDS or imidazole lactate alone.

EXAMPLE III

The procedures of Example II were essentially repeated wherein methylenedianiline (MDA) is substituted for DDS. The results are tabulated in Table V. These data clearly illustrate that imidazole lactate (IL) catalyzed DDS cured epoxy resins produce improved hot adhesive strength and shelf stability over IL-MDA cured epoxy systems.

TABLE IV.—TENSILE SHEAR STRENGTH (P.S.I.) AS ADHESIVE ON CHROMIC ACID ETCHED 2024-T3 CLAD ALUMINUM, WITH STYLE 181-150 GLASS CLOTH SUPPORT

| | | 1 | | 2 | | 3 | 4 | 5 |
|---|---|---|---|---|---|---|---|---|
| | | DDS+ imidazole lactate (IL) | | DDS+ 2-ethyl-4-methyl imidazole (EMI-24) | | DDS Only Initial | I.L. Only Initial | EMI-24 Only Initial |
| Cure cycle | Test. temp., °F. | Initial | 8 days | Initial | 8 days | | | |
| 3 hours at 200° F | 77 | 3,990 | 3,245 | 3,380 | 3,460 | N.T. | 2,770 | 2,450 |
| | 250 | 2,205 | 2,305 | 1,720 | 1,960 | N.T. | 820 | 890 |
| | 350 | N.T. | 880 | N.T. | 950 | N.T. | N.T. | N.T. |
| 1.5 hours at 250° F | 77 | 3,590 | 3,460 | 3,440 | 3,720 | N.T. | 2,705 | 2,502 |
| | 250 | 2,960 | 2,925 | 2,920 | 2,525 | N.T. | 890 | 1,180 |
| | 350 | [1] 1,200 | 1,135 | [1] 875 | 1,170 | N.T. | N.T. | N.T. |
| 1.5 hours at 300° F | 77 | 3,465 | N.T. | 3,060 | N.T. | 2,320 | N.T. | N.T. |
| | 250 | 2,670 | N.T. | 2,475 | N.T. | 550 | N.T. | N.T. |
| 1 hour at 250° F. + 2 hours at 350° F | 77 | N.T. | N.T. | N.T. | N.T. | 3,360 | N.T. | N.T. |
| | 250 | N.T. | N.T. | N.T. | N.T. | 3,165 | N.T. | N.T. |

Note: N.T.=Not Tested.

[1] 48 hours.

TABLE V.—COMPARISON OF DIAMINODIPHENYLSULPHONE (DDS) AND METHYLENEDIANILINE (MDA) WHEN CATALYZED WITH IMIDAZOLE LACTATE

```
Resin Composition #1 ........................................... 100 p.b.w.
Curing Agent: DDS ............................................. 27
           or
           MDA ................................................. 21
Imidazole Lactate .............................................. 1.5
```

| | Gel Time in Minutes | | | | Tensile Shear in p.s.i.[1] | | | | | |
|---|---|---|---|---|---|---|---|---|---|---|
| | At 200° F. | | At 250° F. | | At 75° F. | | At 250° F. | | At 350° F. | |
| Storage Time (days) | MDA | DDS | MDA | DDS | MDA | DDS | MDA | DDS | MDA | DDS |
| Initial | 5.7 | 12-14 | 0.75-1.25 | 2.5-3.5 | 3,485 | 3,210 | 2,120 | 3,130 | 1,000 | 1,000 |
| 1 | 1 | 8-9 | 0.5 | 2.5-3.0 | N.T. | N.T. | N.T. | N.T. | N.T. | N.T. |
| 2 | 0.5 | 8-9 | 0.25 | 1.5-2.0 | 1,615 | 3,685 | 1,085 | 3,295 | 650 | 1,020 |
| 3 | N.F. | 8-9 | <0.25 | 1.5-2.0 | 765 | 3,925 | 785 | 2,600 | 380 | 735 |
| 6 | N.F. | 8-9 | <0.25 | | 1,060 | 3,865 | 1,000 | 3,060 | 310 | 725 |
| 8 | N.F. | 8-9 | <0.25 | 1.0-0.5 | 1,215 | 3,675 | 470 | 3,155 | 450 | 550 |
| | | | | | [2] N.F. | 4,100 | N.F. | 2,535 | N.F. | 775 |

[1] Cure: 1.5 hours at 250° F.
[2] Cure: 3.0 hours at 200° F. after 8 days storage at 75° F.

Note: N.F.=No Fuse; N.T.=Not Tested.

I claim as my invention:

1. A heat-curable, shelf-stable composition having good hot strength which comprises:
   1. a polyepoxide possessing more than one vicinal epoxy group in the molecule,
   2. from about 10 to 40 parts per 100 parts by weight of said polyepoxide of diaminodiphenylsulfone, and
   3. a catalytic amount of an imidazole compound or an acid salt thereof having the general formula:

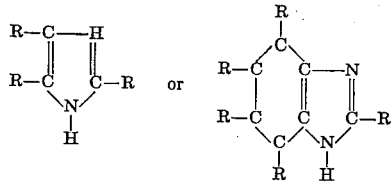

wherein R is selected from the group consisting of hydrogen, halogen or hydrocarbon radicals, and said acid is selected from the group consisting of monocarboxylic acids having from one to 8 carbon atoms, lactic and phosphoric acids.

2. A composition as in claim 1 wherein the imidazole salt is selected from the group consisting of acetate and lactate salts of 2-ethyl-4-methylimidazole, 2-methylimidazole, imidazole, benzimidazole, and mixtures thereof.

3. A composition as in claim 1 wherein the catalyst is imidazole.

4. A composition as in claim 1 wherein the catalyst is 2-ethyl-4-methylimidazole.

5. A composition as in claim 1 wherein the polyepoxide is a glycidyl polyether of a polyhydric phenol.

6. A composition as in claim 5 wherein the polyhydric phenol is 2,2-bis(4-hydroxyphenyl)propane.

7. A cured composition prepared by curing the composition of claim 1 at 90 to 160°C for 1 to 3 hours.

* * * * *